No. 788,645.

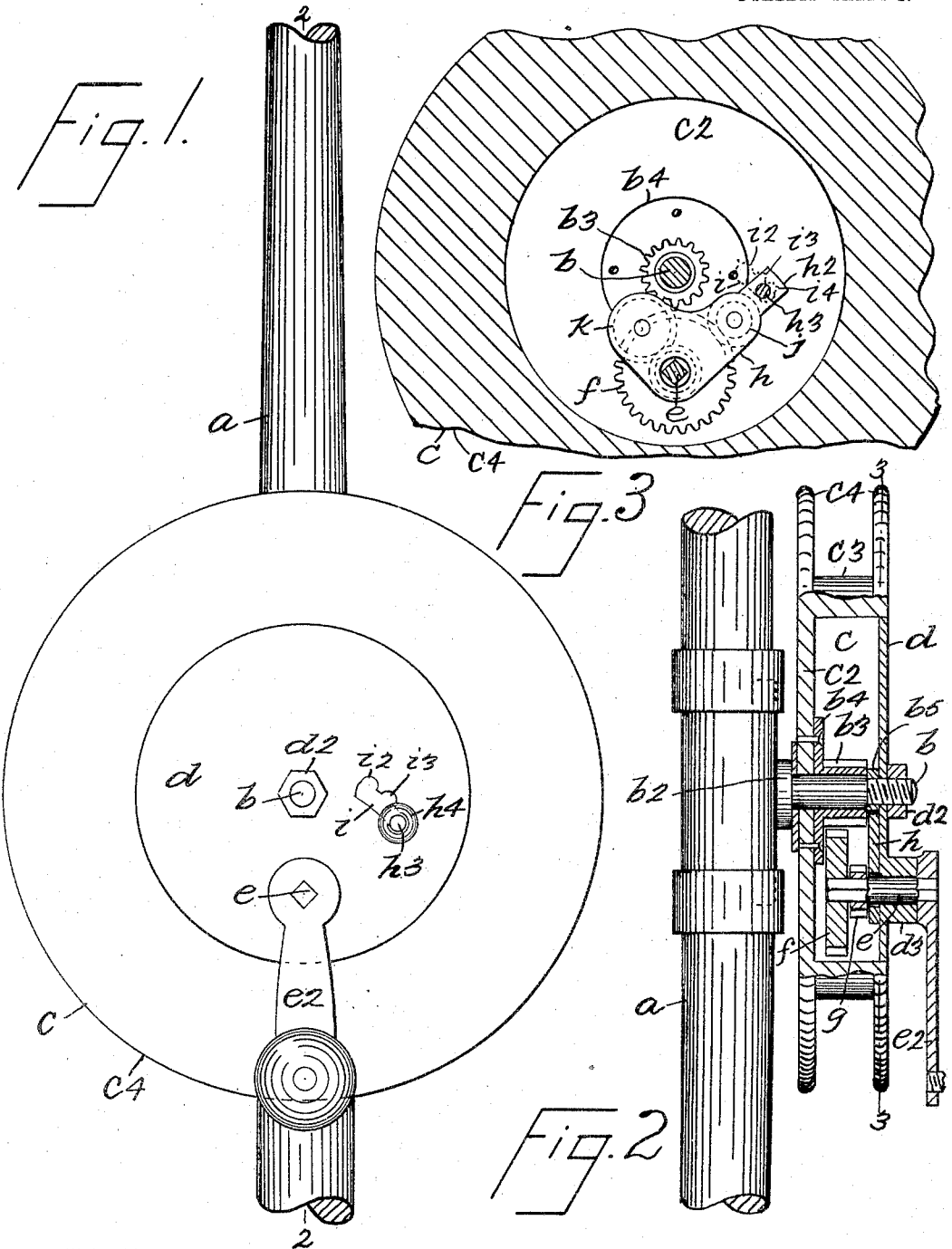

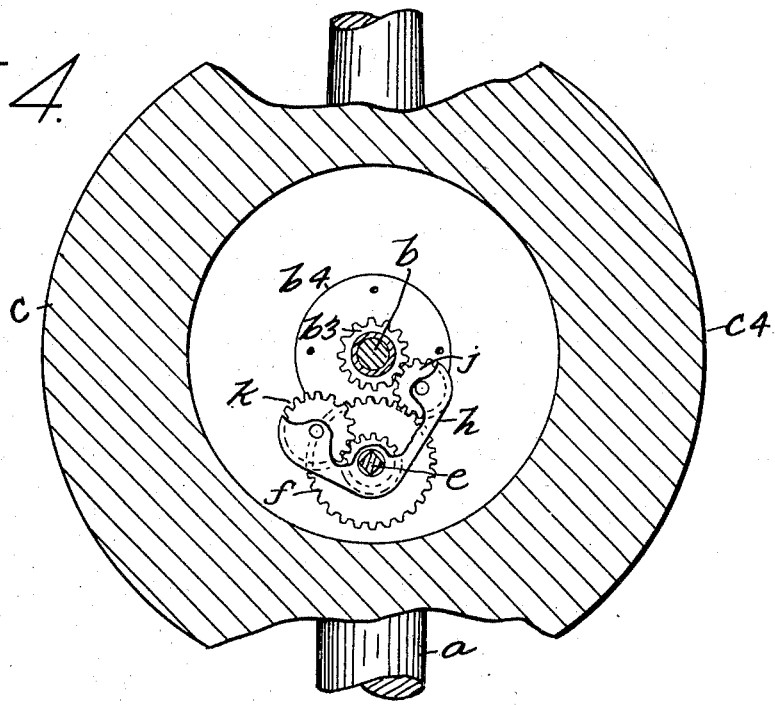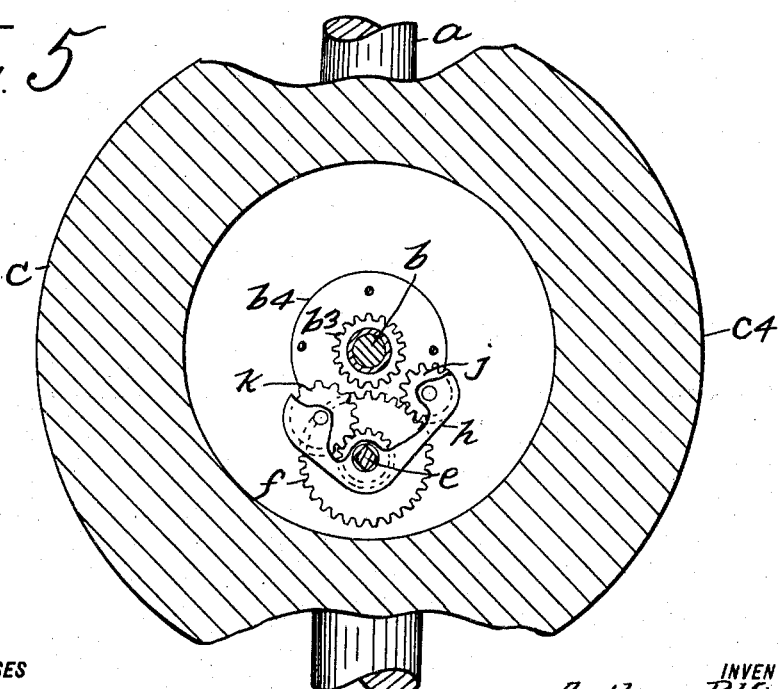

Patented May 2, 1905.

UNITED STATES PATENT OFFICE.

ANTHONY P. HINSKY, OF HOBOKEN, NEW JERSEY.

FISH-REEL.

SPECIFICATION forming part of Letters Patent No. 788,645, dated May 2, 1905.

Application filed September 12, 1904. Serial No. 224,102.

*To all whom it may concern:*

Be it known that I, ANTHONY P. HINSKY, a citizen of the United States, residing at Hoboken, in the county of Hudson and State of New Jersey, have invented certain new and useful Improvements in Fish-Reels, of which the following is a specification, such as will enable those skilled in the art to which it appertains to make and use the same.

This invention relates to fishing-reels; and the object thereof is to provide an improved device of this class whereby the reel may be given different speeds in winding up the line and allowed to run free when the line is being drawn out; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a part of a fish-pole provided with my improved reel; Fig. 2, a plan view with a part of the reel shown in section; Fig. 3, a sectional side view of the reel; Fig. 4, a view similar to Fig. 3, but showing also a part of the pole and showing the gearing of the reel in a different position; and Fig. 5, a view similar to Fig. 4, but showing the gearing in a different position.

In the drawings forming part of this specification, I have shown at $a$ a part of a fishpole, and secured to one side thereof is a stub-shaft $b$, the inner end of which is provided with a hub or shoulder $b^2$. The reel $c$ is mounted on the stub-shaft $b$ and consists of an inner plate $c^2$, provided on its outer side and at a predetermined distance from the perimeter thereof with a drum-rim $c^3$, having two projecting flanges $c^4$, between which in practice the line is wound.

The outer end of the stub-shaft $b$ is screw-threaded, and mounted thereon is a stationary plate $d$, which fits within the drum-rim $c^3$, and mounted on the stub-shaft $b$ is a gear-wheel $b^3$, provided with a plate $b^4$, which is secured to the plate $c^2$ of the reel, and secured to the screw-threaded portion of the stub-shaft between the plate $d$ and the gear-wheel $b^3$ is a collar $b^5$, and the plate $d$ is held on the stub-shaft $b$ by a nut $d^2$.

The plate $d$ is provided on its outer side and at a predetermined distance from the center thereof with a hub $d^3$, through which is passed a crank-shaft $e$, provided with a crank $e^2$, and secured to the inner end of the crank-shaft $e$ is a gear-wheel $f$, and said crank-shaft is also provided between the gear-wheel $f$ and the plate $d$ with a pinion $g$, said pinion and said gear-wheel $f$ being rigidly connected with said crank-shaft, or said pinion may be secured to said gear-wheel, if desired.

Mounted on the crank-shaft between the pinion $g$ and the plate $d$ and rotatable on said shaft is a triangular plate or gear-holder $h$, one part of which is provided with an arm $h^2$, having a pin $h^3$, which passes through a tangential slot $i$ in the plate $d$ and is provided with a knob or handle $h^4$, and the tangential slot $i$ is preferably provided in its convex side with notches or recesses $i^2$, $i^3$, and $i^4$, all of which are shown in dotted lines in Fig. 3 and two of which are shown in full lines in Fig. 1, and these notches or recesses are intended to indicate the different positions of the pin $h^3$, and said pin may be caused to enter said notches or recesses, if desired. One arm of the triangular plate or gear-holder $h$, part of which is broken away in Figs. 4 and 5 to better show the gearing, is provided with a small gear $j$ and the other with a larger gear $k$, and it will be understood that the plate or gear-holder $h$ may be moved into different positions by swinging the same on the crank-shaft $e$, which is done by means of the pin $h^3$. When the plate or gear-holder $h$ is in the position shown in Fig. 3 and the pin $h^3$ in the outer end of the slot $i$, the gear-wheel $k$ is in mesh with the pinion $g$ and with the gear-wheel $b^3$, and the reel is given a slow movement to wind up the line. When the plate or gear-holder $h$ is in the position shown in Fig. 4, the pin $h^3$ will be in the inner end of the slot $i$ and the small gear $j$ will be in mesh with the wheel $f$ and the wheel $b^3$, and the reel will be given a rapid movement in the direction to wind up the line. When the the plate or gear-holder $h$ is in the position shown in Fig. 5, the pin $h^3$ will be in the middle recess $i^2$ or at the middle recess $i^2$, and the reel will be free to turn on the stub-shaft $b$, this position being that of the parts when the line is running out.

It will be understood that the plate $d$ is stationary at all times and that the reel, with the gear-wheel $b^3$, will turn freely on the shaft $b$.

By means of this construction it will be seen that I provide a reel capable of two different speeds in the operation of winding up a line and free to turn in the opposite direction when necessary. It will also be seen that the body portion of the reel is provided with a central chamber in which all the gearing is placed, and the outer side thereof or the central portion of said outer side consists of a stationary plate through which the crank-shaft passes and in which is formed the slot $i$.

Having fully described my invention, what I claim as new, and desire to secure by Letters Patent, is—

1. A fish-reel mounted on a stationary shaft and provided with a central chamber in which is a central gear secured to said reel and through which said shaft passes, a stationary center plate which forms the outer side of the reel and which is secured on said shaft, a crank-shaft passing through the said stationary plate and provided at its inner end with a gear-wheel, which is secured thereto, a pinion mounted on said crank-shaft between said gear-wheel and said stationary plate and adapted to turn with said crank-shaft, a triangular gear-holder mounted on said crank-shaft between said pinion and said stationary plate and provided with separate gears, and means for moving said gear-holder on said crank-shaft, substantially as shown and described.

2. A fish-rod provided at one side with a stub-shaft, a reel mounted on said shaft and provided with a gear which is secured therein and through which said shaft passes, a stationary plate secured to the outer end of said shaft and forming a central chamber in the reel, a crank-shaft passing through said stationary plate and provided at its inner end with a gear-wheel and a pinion, a gear-holder mounted between the pinion and the stationary plate and adapted to turn on the crank-shaft, and two gears connected with the gear-holder one of which is adapted to operate in connection with the gear through which the stub-shaft passes and with the pinion on the crank-shaft, and the other of which is adapted to operate in connection with the gear through which the stub-shaft passes and the gear-wheel on the crank-shaft, and means for turning said gear-holder on the crank-shaft, substantially as shown and described.

In testimony that I claim the foregoing as my invention I have signed my name, in presence of the subscribing witnesses, this 10th day of September, 1904.

ANTHONY P. HINSKY.

Witnesses:
F. A. STEWART,
C. E. MULREANY.